US009646542B2

(12) United States Patent
Byun

(10) Patent No.: US 9,646,542 B2
(45) Date of Patent: May 9, 2017

(54) DISPLAY DEVICE COMPENSATING IR-DROP OF SUPPLY VOLTAGE

(71) Applicant: SAMSUNG DISPLAY CO., LTD., Yongin, Gyeonggi-Do (KR)

(72) Inventor: Min-Woo Byun, Jeju-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 210 days.

(21) Appl. No.: 14/682,579

(22) Filed: Apr. 9, 2015

(65) Prior Publication Data

US 2016/0117987 A1 Apr. 28, 2016

(30) Foreign Application Priority Data

Oct. 28, 2014 (KR) ........................ 10-2014-0147786

(51) Int. Cl.

*G06F 3/038* (2013.01)
*G09G 3/3266* (2016.01)
*G09G 3/3233* (2016.01)

(52) U.S. Cl.

CPC ......... *G09G 3/3266* (2013.01); *G09G 3/3233* (2013.01); *G09G 2320/0223* (2013.01); *G09G 2330/02* (2013.01)

(58) Field of Classification Search

CPC ............... G09G 3/3266; G09G 3/3233; G09G 2330/02; G09G 2320/0223; G09G 3/00; G09G 2300/0819; G09G 2310/0202; G09G 2330/021; G09G 2330/023; G09G 2330/025; G09G 2330/08; G09G 2300/0421; G09G 2300/0426; G09G 2300/043; G09G 2310/0264; G09G 2310/027; G09G 2310/0272; G09G 2310/0275; G09G 2310/0278; G09G 2320/00; G09G 2320/0204; G09G 2320/0228; G09G 2320/0233; G09G 2320/02

See application file for complete search history.

(56) References Cited

U.S. PATENT DOCUMENTS 7,202,842 B2 * 4/2007 Kasai .................. G09G 3/3225 345/693
2007/0040772 A1 * 2/2007 Kim ..................... G09G 3/3233 345/76

(Continued)

FOREIGN PATENT DOCUMENTS

KR 10-2007-0074779 A 7/2007
KR 10-2010-0054894 A 5/2010

(Continued)

*Primary Examiner* — Rodney Amadiz
(74) *Attorney, Agent, or Firm* — Lee & Morse, P.C.

(57) ABSTRACT

A gate driver circuit includes a gate driver coupled to a gate line. The gate driver generates a gate signal for input to a plurality of pixels and controls a current of the gate signal based on an IR-drop of a supply voltage supplied to the pixels through a supply voltage distribution line. The gate driver decreases the current of the gate signal when the IR-drop increases, and increases the current of the first gate signal when the IR-drop decreases. A pulse width of an activation period of the gate signal decreases and luminance of the pixels increases when the current of the first row pixels decreases.

20 Claims, 9 Drawing Sheets

(56) References Cited

U.S. PATENT DOCUMENTS

| | | | | |
|---|---|---|---|---|
| 2014/0009446 A1* | 1/2014 | Lee | G09G 3/3208 | 345/204 |
| 2014/0097743 A1* | 4/2014 | Eom | H01L 51/52 | 313/498 |

FOREIGN PATENT DOCUMENTS

| | | | |
|---|---|---|---|
| KR | 10-2010-0082933 | A | 7/2010 |
| KR | 10-2014-0005607 | A | 1/2014 |

* cited by examiner

GDU1

160B

DISPLAY DEVICE COMPENSATING IR-DROP OF SUPPLY VOLTAGE

CROSS-REFERENCE TO RELATED APPLICATION

Korean Patent Application No. 10-2014-0147786, filed on Oct. 28, 2014, and entitled, “Display Device Compensating Ir-Drop Of Supply Voltage,” is incorporated by reference herein in its entirety.

BACKGROUND

1. Field

One or more embodiments described herein relate to a display device that compensates IR-drop of a supply voltage.

2. Description of the Related Art

An organic light-emitting display uses pixels which emit light from organic light emitting diodes (OLEDs). Each diode emits light based on a recombination of electrons and holes in an active layer. Displays of this type offer numerous advantages including fast response speed and low power consumption.

Each pixel includes a driving transistor that provides current to an OLED, which causes the OLED to emit light with a grayscale level based on image data. In order to emit light, a supply voltage and data signals are provided via distribution lines in the display. A voltage drop (IR-drop) occurs on the distribution lines to cause degradation in image quality. Also, a lower supply voltage and data signals having lower voltages may affect the amount of current flowing through the driving transistors of the pixels, and also may degrade long range uniformity of the display device.

SUMMARY

In accordance with one or more embodiments, a display device includes a display panel including a plurality of pixels, a supply voltage distribution line, and a ground voltage distribution line, the supply voltage distribution line and the ground voltage distribution line connected to the pixels; a voltage supplier to provide a supply voltage to a first node and a ground voltage to a second node, the first node in the supply voltage distribution line and the second node in the ground voltage distribution line; a timing controller to generate a data driver control signal and a gate driver control signal based on an input image signal; a data driver to generate a plurality of data signals based on the data driver control signal, and to provide the data signals to the pixels through a plurality of respective data lines; and a gate driver circuit including a plurality of gate drivers to generate gate signals based on the gate driver control signal, and to provide the gate signals to the pixels through a plurality of respective gate lines. At least one first gate driver is to transfer a first gate signal to first row pixels through a first gate line, and the first gate driver is to control a current of the first gate signal based on a first IR-drop of the supply voltage to the first row pixels through the supply voltage distribution line.

The first gate driver may include an output transistor to generate the first gate signal based on the gate driver control signal. The current of the first gate signal may be controlled based on a ratio of a width and a length of the output transistor.

The first gate driver may decrease the current of the first gate signal when the first IR-drop increases. A pulse width of an activation period of the first gate signal may decrease and a luminance of the first row pixels may increase when the current of the first row pixels decreases. The first gate driver may increase the current of the first gate signal when the first IR-drop decreases. A pulse with of an activation period of the first gate signal may increase and a luminance of the first row pixels may decrease when the current of the first row pixels increases.

The first IR-drop may be proportional to a distance between the first node and the first row pixels on the supply voltage distribution line. At least one second gate driver may transfer a second gate signal to a second row pixels through a second gate line, and the second gate driver may control a current of the second gate signal based on a second IR-drop of the supply voltage to the second row pixels through the supply voltage distribution line. The current of the first gate signal may be less than the current of the second gate signal when the first gate line is farther from the first surface than the second gate line.

The plurality of the gate drivers may include a plurality of first gate drivers and a plurality of second gate drivers, and the first gate drivers may generate first gate signals having a first current and the second gate drivers to generate second gate signals having a second current when first gate lines connected to the first gate drivers are farther from the first surface than second gate lines connected to the second gate drivers, the second current greater than the first current.

In accordance with one or more other embodiments, a display device includes a display panel including a plurality of pixels, a supply voltage distribution line, and a ground voltage distribution line, the supply voltage distribution line and the ground voltage distribution line connected to the pixels; a voltage supplier to provide a supply voltage to a first node in the supply voltage distribution line and a ground voltage to a second node in the ground voltage distribution line; a data driver to generate a plurality of data signals based on a data driver control signal, and to provide the data signals to the pixels through a plurality of respective data lines; and a gate driver circuit including a plurality of gate drivers to generate gate signals based on a gate driver control signal, and to provide the gate signals to the pixels through a plurality of respective gate lines.

The first gate drivers are to transfer the first gate signal to a first row pixels through the first gate line, the first gate drivers are to control a current of the first gate signal based on a first IR-drop of the supply voltage to the first row pixels through the supply voltage distribution line and a second IR-drop of the data signals to the first row pixels through the data lines.

The first IR-drop may be proportional to a distance between the first node and the first row pixels on the supply voltage distribution line. The first gate drivers may decrease the current of the first gate signal when the first IR-drop increases, and the first gate drivers may increase the current of the first gate signal when the second IR-drop increases. The first gate drivers may increase the current of the first gate signal when the first IR-drop decreases, and the first gate drivers may decrease the current of the first gate signal when the second IR-drop decreases.

In accordance with one or more other embodiments, a gate driver circuit includes an interface; and a gate driver coupled to the interface, wherein the gate driver is to generate a gate signal for input to a row of pixels, the gate driver to transfer the gate signal to the row of pixels and to control a current of the gate signal based on an IR-drop of a supply voltage supplied to the first row of pixels through a supply voltage distribution line.

The gate driver may include an output transistor to generate the gate signal, and wherein the current of the gate signal is based on a ratio of a width and a length of the output transistor. The gate driver may decrease the current of the first gate signal when the IR-drop increases. A pulse width of an activation period of the gate signal may decrease and a luminance of the row of pixels may increase when the current of the first row of pixels decreases. The gate driver may increase the current of the gate signal when the IR-drop decreases.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
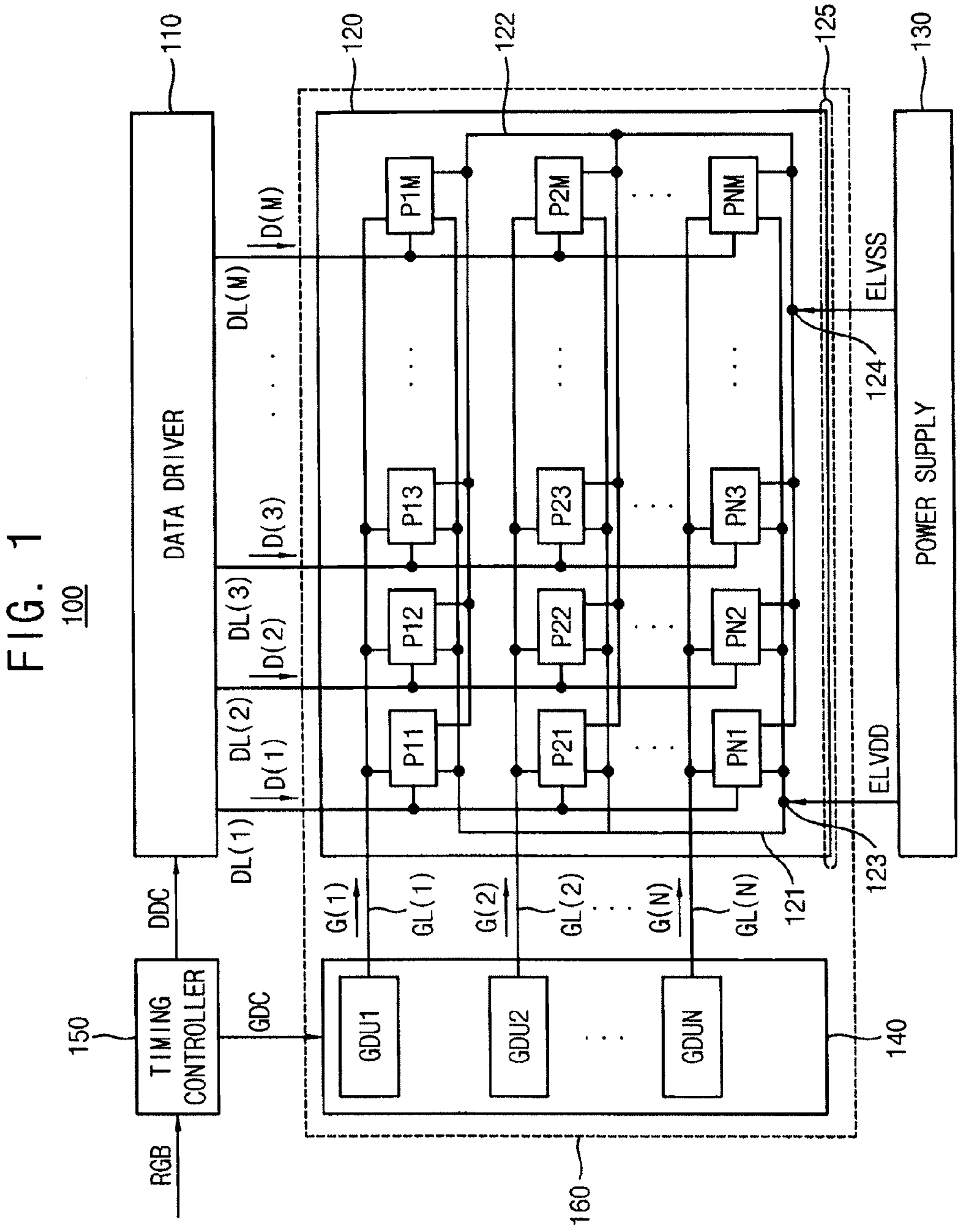
FIG. 1 illustrates an embodiment of a display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the dimensions of layers and regions may be exaggerated for clarity of illustration. Like reference numerals refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

FIG. 1 illustrates an embodiment of a display device 100 which includes a display panel 120, a voltage supplier 130, a timing controller 150, a data driver 110, and a gate driver circuit 140. The display device 100 includes a first circuit 160, which includes the gate driver circuit 140 and the display panel 120.

The display panel 120 includes a plurality of pixels P11 through P13, P1M, P21 through P23, P2M, PN1 through PN3, and PNM, a supply voltage distribution line 121, and a ground voltage distribution line 122. The supply voltage distribution line 121 and the ground voltage distribution line 122 are connected to the pixels, respectively.

The voltage supplier 130 provides a supply voltage ELVDD to a first node 123, which is included in the supply voltage distribution line 121 and close to a first surface 125 of the display panel 120. The voltage supplier 130 provides a ground voltage ELVSS to a second node 124, which is included in the ground voltage distribution line 122 and close to the first surface 125.

The timing controller 150 generates a data driver control signal DDC and a gate driver control signal GDC based on an input image signal RGB.

The data driver 110 generates a plurality of data signals D(1), D(2), D(3) through D(M) (M is a natural number) based on the data driver control signal DDC, and provides the data signals D(1), D(2), D(3) through D(M) to the plurality of the pixels P11 through P13, P1M, P21 through P23, P2M, PN1 through PN3, and PNM through a plurality of data lines DL(1), DL(2), DL(3) through DL(M).

The gate driver circuit 140 includes a plurality of gate drivers GDU1, GDU2 through GDUN (N is a natural number) which generate a plurality of gate signals G(1), G(2) through G(N) based on the gate driver control signal GDC. The gate signals G(1), G(2) through G(N) are provided to the plurality of the pixels P11 through P13, P1M, P21 through P23, P2M, PN1 through PN3, and PNM through a plurality of gate lines GL(1), GL(2) through GL(N).

The first gate driver GDU1 transfers the first gate signal G(1) to first row pixels P11, P12, P13 through P1M through the first gate line GL(1). The second gate driver GDU2 transfers the second gate signal G(2) to second row pixels P21, P22, P23 through P2M through the second gate line GL(2). The (N)-th gate driver GDUN transfers the (N)-th gate signal G(N) to (N)-th row pixels PN1, PN2, PN3 through PNM through the (N)-th gate line GL(N). The gate driver circuit 140 may be coupled to the gate lines through an interface. The interface may be, for example, outputs of a chip which includes the gate driver circuit 140 or may be the gate lines themselves.

The first gate driver GDU1 controls a current of the first gate signal G(1) based on a first IR-drop of the supply voltage ELVDD to the first row pixels P11, P12, P13 through P1M through the supply voltage distribution line 121. The second gate driver GDU2 controls a current of the second gate signal G(2) based on a second IR-drop of the supply voltage ELVDD to the second row pixels P21, P22, P23 through P2M through the supply voltage distribution line 121. The (N)-th gate driver GDUN controls a current of the (N)-th gate signal G(N) based on a (N)-th IR-drop of the supply voltage ELVDD to the (N)-th row pixels PN1, PN2, PN3 through PNM through the supply voltage distribution line 121.

In one example embodiment, the current of the first gate signal G(1) may be less than the current of the second gate signal G(2) when the first gate line GL(1) is farther away from the first surface 125 than the second gate line GL(2). In one example embodiment, the first IR-drop may be in proportion to a distance from the first node 123 to the first row pixels P11, P12, P13 through P1M on the supply voltage distribution line 121.

Figure 2:
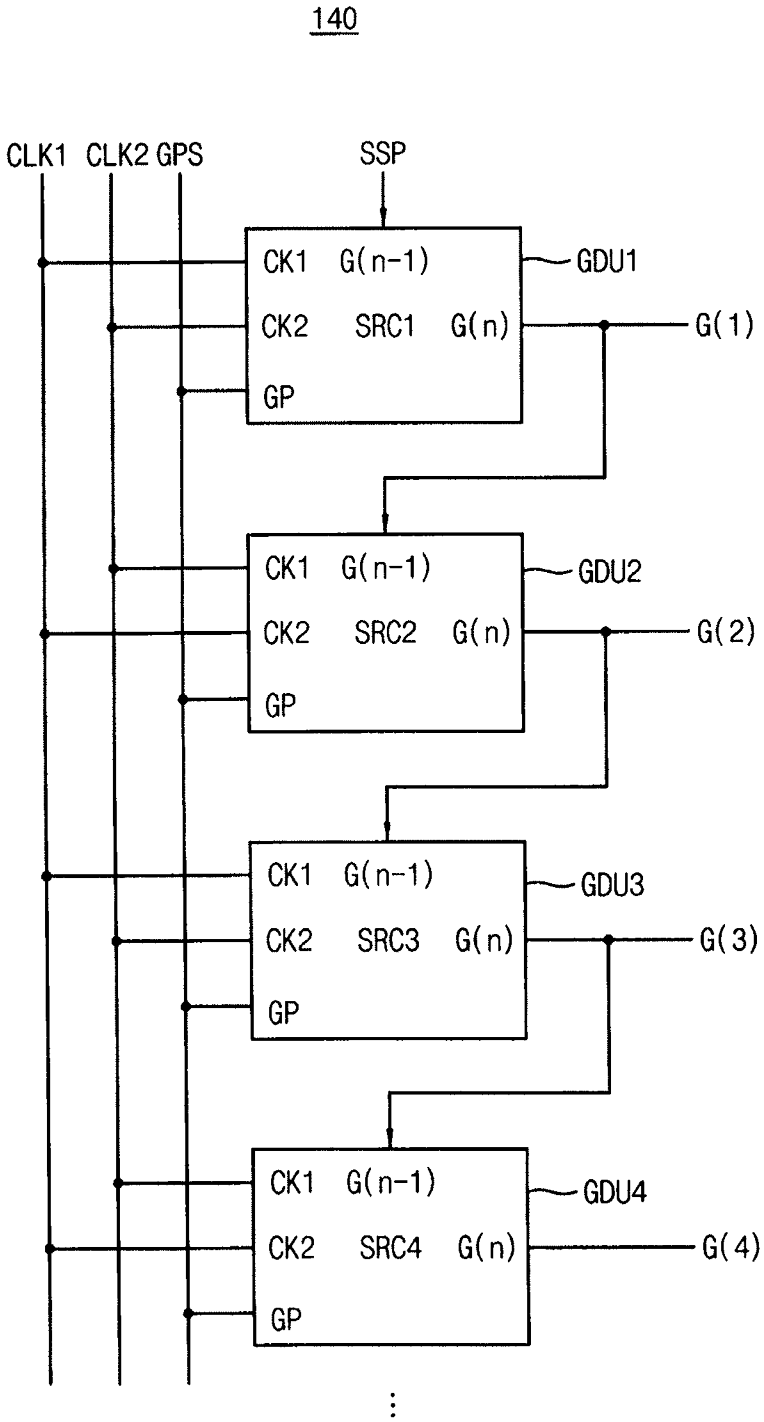
FIG. 2 illustrates an embodiment of a gate driver circuit.
Figure 3:
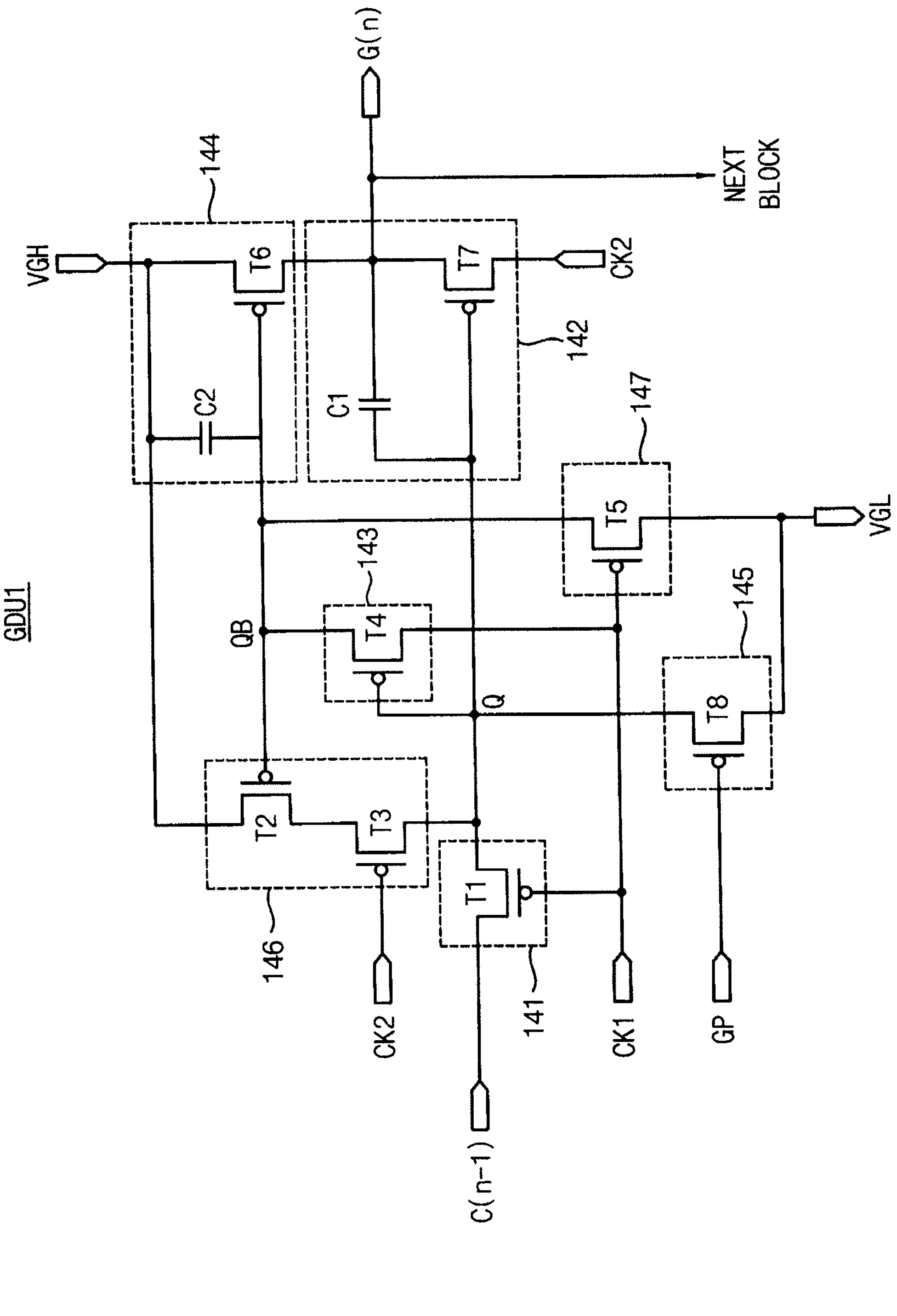
FIG. 3 illustrates an embodiment of a first gate driver of the gate driver circuit.
Figure 4:
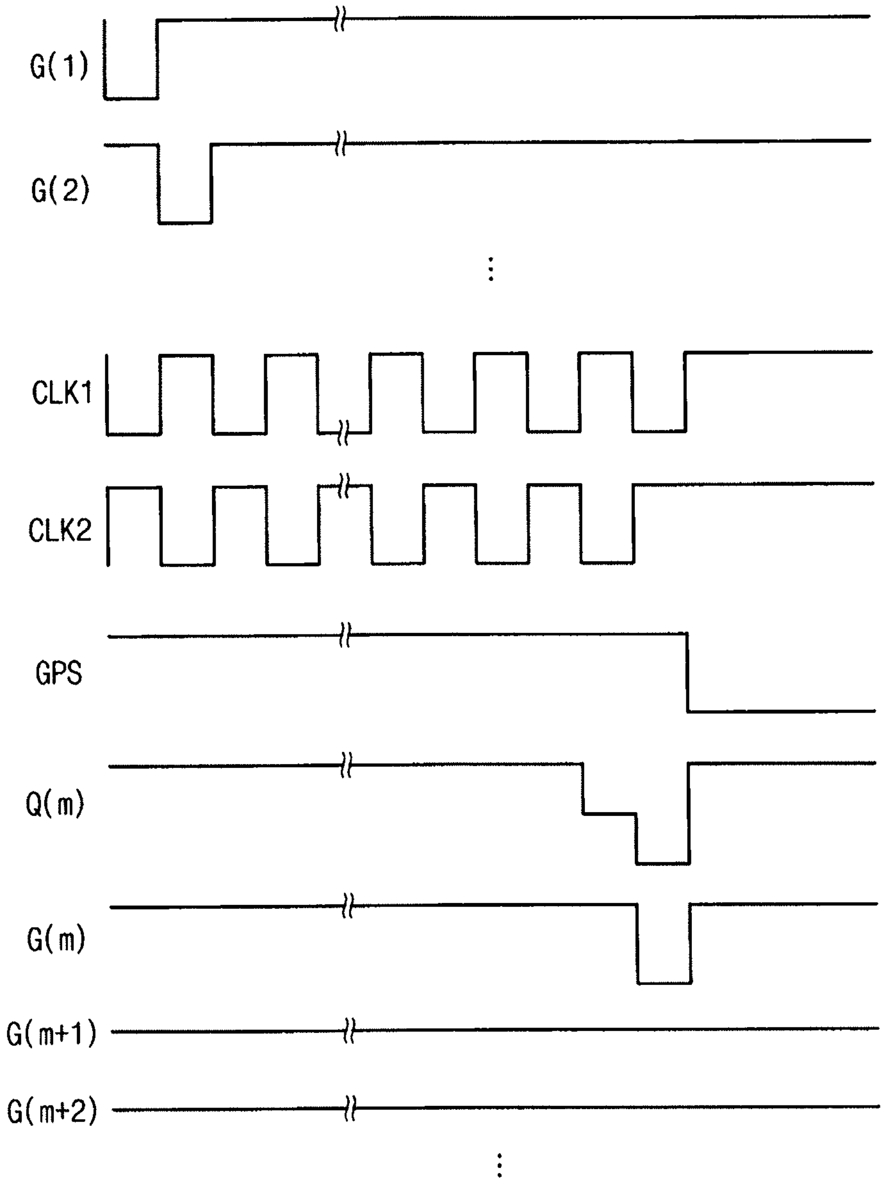
FIG. 4 illustrates an example of signals of the gate driver circuit.

FIG. 2 illustrates an embodiment of the gate driver circuit 140 in FIG. 1. FIG. 3 illustrates an embodiment of the first gate driver in the gate driver circuit 140 of FIG. 2. FIG. 4 is a timing diagram illustrating an example of signals of the gate driver circuit 140.

Referring to FIGS. 2 through 4, the gate driver circuit 140 includes a plurality of gate drivers GDU1, GDU2, GDU3, and GDU4. The gate driver circuit 140 may further include a gate driver other than the gate drivers GDU1, GDU2, GDU3, and GDU4.

As illustrated in FIG. 3, each of the gate drivers GDU1, GDU2, GDU3, and GDU4 may include a first clock terminal CK1, a second clock terminal CK2, an output control terminal GP, an input terminal G(n−1), and an output terminal G(n). Also, each of the gate drivers GDU1, GDU2, GDU3, and GDU4 may include a first voltage input terminal and a second voltage input terminal.

A first gate clock signal CLK1 and a second gate clock signal CLK2 having different timings may be applied to the first clock terminal CK1 and the second clock terminal CK2. For example, the second gate clock signal CLK2 may be a signal inverted from the first gate clock signal CLK1. In adjacent gate drivers, the first gate clock signal CLK1 and the second gate clock signal CLK2 may be applied to the clock terminals in opposite sequences.

For example, the first gate clock signal CLK1 may be applied to the first clock terminal CK1 of odd-numbered gate drivers GDU1, GDU3, . . . , and the second gate clock signal CLK2 may be applied to the second clock terminal CK2 of the odd-numbered gate drivers GDU1, GDU3, . . . . In contrast, the second gate clock signal CLK2 may be applied to the first clock terminal CK1 of even-numbered gate drivers GDU2, GDU4, . . . , and the first gate clock signal CLK1 may be applied to the second clock terminal CK2 of the even-numbered gate drivers GDU2, GDU4, . . . .

An output control signal GPS may be applied to the output control terminal GP. The output control signal GPS may be simultaneously applied to each output control terminal GP of all gate drivers GDU1, GDU2, GDU3, GDU4, . . . , to control the overall display panel 120.

The vertical start signal SSP or the gate signal of the previous gate driver may be applied to the input terminal G(n−1). Thus, the vertical start signal SSP is applied to the input terminal G(n−1) of the first gate driver GDU1. The first gate signal G(1) generated by the first gate driver GDU1 is applied to the input terminal G(n−1) of the second gate driver GDU2. The second gate signal G(2) generated by the second gate driver GDU2 is applied to the input terminal G(n−1) of the third gate driver GDU3. The third gate signal G(3) generated by the third gate driver GDU3 is applied to the input terminal G(n−1) of the fourth gate driver GDU4. Additional gate drivers may be included which operate in a similar manner.

The output terminal G(n) may output the gate signal to the gate line electrically connected to the output terminal G(n). For example, the gate signals G(1), G(3), . . . , may be output from the output terminal G(n) of the odd-numbered gate drivers GDU1, GDU3, . . . , during a logic low level period of the second gate clock signal CLK2. The gate signals G(2), G(4), . . . , may be output from the output terminal G(n) of the even-numbered gate drivers GDU2, GDU4, . . . , during a logic low level period of the first gate clock signal CLK1.

The supply voltage ELVDD may be provided to the first voltage input terminal. The ground voltage ELVSS may be provided to the second voltage input terminal.

As shown in FIG. 3, the first gate driver GDU1 in the gate driver circuit 140 may include a first input circuit 141, a first output circuit 142, a second input circuit 143, a second output circuit 144, an output control circuit 145, a stabilizing circuit 146, and a holding circuit 147. The vertical start signal SSP may be applied to the input terminal G(n−1) of the first gate driver GDU1. A first clock signal may be applied to a first clock terminal CK1. A second clock signal CLK2 may be applied to a second clock terminal CK2. The supply voltage ELVDD may be applied to a first voltage input terminal VGH. The ground voltage ELVSS may be applied to a second voltage input terminal VGL. Remaining gate drivers (e.g, GDU2, GDU3, GDU4, etc.) may operation in a similar manner.

The first input circuit 141 may apply the vertical start signal SSP to a first node Q based on the first clock signal CLK1. The first input circuit 141 may include a first input transistor T1. The first input transistor T1 may include a gate electrode to which the first clock signal CLK1 is applied, a source electrode to which the vertical start signal SSP is applied, and a drain electrode connected to the first node Q.

The first output circuit 142 may output the second clock signal CLK2 as the first gate signal G(1) based on a first node signal applied to the first node Q. The first output part 142 may adjust the first gate signal G(1) to a first logic level (e.g., low level) based on the first node signal. The first output circuit 142 may include a first output transistor T7 and a first capacitor C1. The first output transistor T7 may include a gate electrode connected to the first node Q, a source electrode to which the second clock signal CLK2 is applied, and a drain electrode connected to an output terminal G(n) that outputs the first gate signal G(1). The first capacitor C1 may include a first electrode connected to the first node Q and a second electrode connected to the output terminal G(n).

The second input circuit 143 may apply the first clock signal CLK1 to a second node QB based on the first node signal. The second input circuit 143 may include a second input transistor T4. The second input transistor T4 may include a gate electrode connected to the first node Q, a source electrode to which the first clock signal CLK1 is applied, and a drain electrode connected to the second node QB.

The second output circuit 144 may output the supply voltage ELVDD as the first gate signal G(1) based on a second node signal applied to the second node QB. The second output circuit 144 may adjust the first gate signal G(1) to a second logic level (e.g., high level) based on the second node signal. The second output circuit 144 may include a second output transistor T6 and a second capacitor C2. The second output transistor T6 may include a gate electrode connected to the second node QB, a source electrode to which the supply voltage ELVDD is applied, and a drain electrode connected to an output terminal G(n) that outputs the first gate signal G(1). The second capacitor C2 may include a first electrode connected to the second node QB and a second electrode to which the supply voltage ELVDD is applied.

In an example embodiment, the current of the first gate signal G(1) may be controlled by changing a first ratio of a width (W) of the first output transistor T7 and a length (L) of the first output transistor T7, and by changing a second ratio of a width (W) of the second output transistor T6 and a length (L) of the second output transistor T6. For example, the current of the first gate signal G(1) may be increased by increasing the first ratio and the second ratio, and the current of the first gate signal G(1) may be decreased by decreasing the first ratio and the second ratio.

The output control circuit 145 may activate the first output part 142 based on an output control signal GPS. The output control circuit 145 may include an output control transistor T8. The output control transistor T8 may include a gate electrode to which the output control signal GPS is applied, a source electrode to which the ground voltage ELVSS is applied, and a drain electrode connected to the first node Q.

The output control signal GPS may be applied to the output control circuit 145 to restrict the gate signals G(1), G(2), G(3), G(4), . . . of all gate drivers GDU1, GDU2, GDU3, GDU4, . . . .

In an example embodiment, the first clock signal CLK1 and the second clock signal CLK2 may have the second logic level when the output control signal GPS has the first logic level to restrict the first gate output signal G(1). Thus, the output control signal GPS having the first logic level may be applied to the output control circuit 145 to turn on the output control circuit 145 and to activate the first output circuit 142.

When the first output circuit 142 is activated, thus the first output circuit 142 is turned on, the second clock signal CLK2 having the second logic level may be outputted as the first gate signal G(1). For example, in the foldable display panel or the flexible display panel having the non-display region, the output control signal GPS having the first logic level may be outputted and the first and second clock signals CLK1, CLK2 having the second logic level is outputted to gate drivers corresponding to the non-display region.

The stabilizing circuit 146 may stabilize the first gate signal G(1) based on the second node signal and the second clock signal CLK2. The stabilizing circuit 146 may include a first stabilizing transistor T2 and a second stabilizing transistor T3 that are connected to each other in series. The first stabilizing transistor T2 may include a gate electrode connected to the second node QB, a source electrode to which the supply voltage ELVDD is applied, and a drain electrode connected to a source electrode of the second stabilizing transistor T3. The second stabilizing transistor T3 may include a gate electrode to which the second clock signal CLK2 is applied, the source electrode connected to the drain electrode of the first stabilizing transistor T2, and a drain electrode connected to the first node Q.

The holding circuit 147 may maintain the second node signal based on the first clock signal CLK1. The holding circuit 147 may include a holding transistor T5. The holding transistor T5 may include a gate electrode to which the first clock signal CLK1 is applied, a source electrode to which the ground voltage ELVSS is applied, and a drain electrode connected to the second node QB. For example, when the first clock signal CLK1 has the second logic level, the holding transistor T5 may be turned off. When the first clock signal CLK1 has the first logic level, the holding transistor T5 of the holding circuit 370 may be turned on, to thereby maintain the voltage of the second node QB as the ground voltage ELVSS.

As illustrated in FIG. 4, the output control signal GPS, the first gate clock signal CLK1, and the second gate clock signal CLK2 may be controlled to restrict the gate signals G(m+1) and G(N) corresponding to gate drivers of the non-display region.

In the first through (m)-th gate drivers GDU1 through GDUm (m is a natural number less than N), which correspond to gate drivers of the display region among the first through the (N)-th gate drivers GDU1 through GDUN, the output control signal GPS may have the second logic level (e.g., high level). The first and second gate clock signals CLK1, CLK2 may have clock signals with different timings. Therefore, the first through (m)-th gate signals G(1), G(2), . . . , G(m) are sequentially output and images corresponding to the image data are displayed in the display region.

On the other hand, in the (m+1)-th through (N)-th gate drivers GDUm+1 through GDUN which correspond to the non-display region, the output control signal GPS may have the first logic level (e.g., low level). The first and second gate clock signals CLK1, CLK2 may have the second logic level (e.g., high level). The (m+1)-th through (N)-th gate signals G(m+1), . . . , G(N) are restricted not to display the unnecessary image in the non-display region.

Therefore, the display device 100 may reduce the power consumption because the image is not displayed in the non-display region. As a result, the clock signals in gate drivers corresponding to the non-display region need not be generated because the first and second gate clock signal CLK1, CLK2 are maintained at the second logic level. As a result, the number of internal charging operations may be reduced.

In addition, when the display device 100 is an organic light-emitting display, the organic light emitting diodes in the non-display region do not emit light because the gate signals corresponding to the non-display region are blocked. Therefore, power consumption is reduced because the output control signal GPS, the first gate clock signal CLK1, and the second gate clock signal CLK2 are controlled and the display panel 120 does not display in the non-display region.

Figure 5:
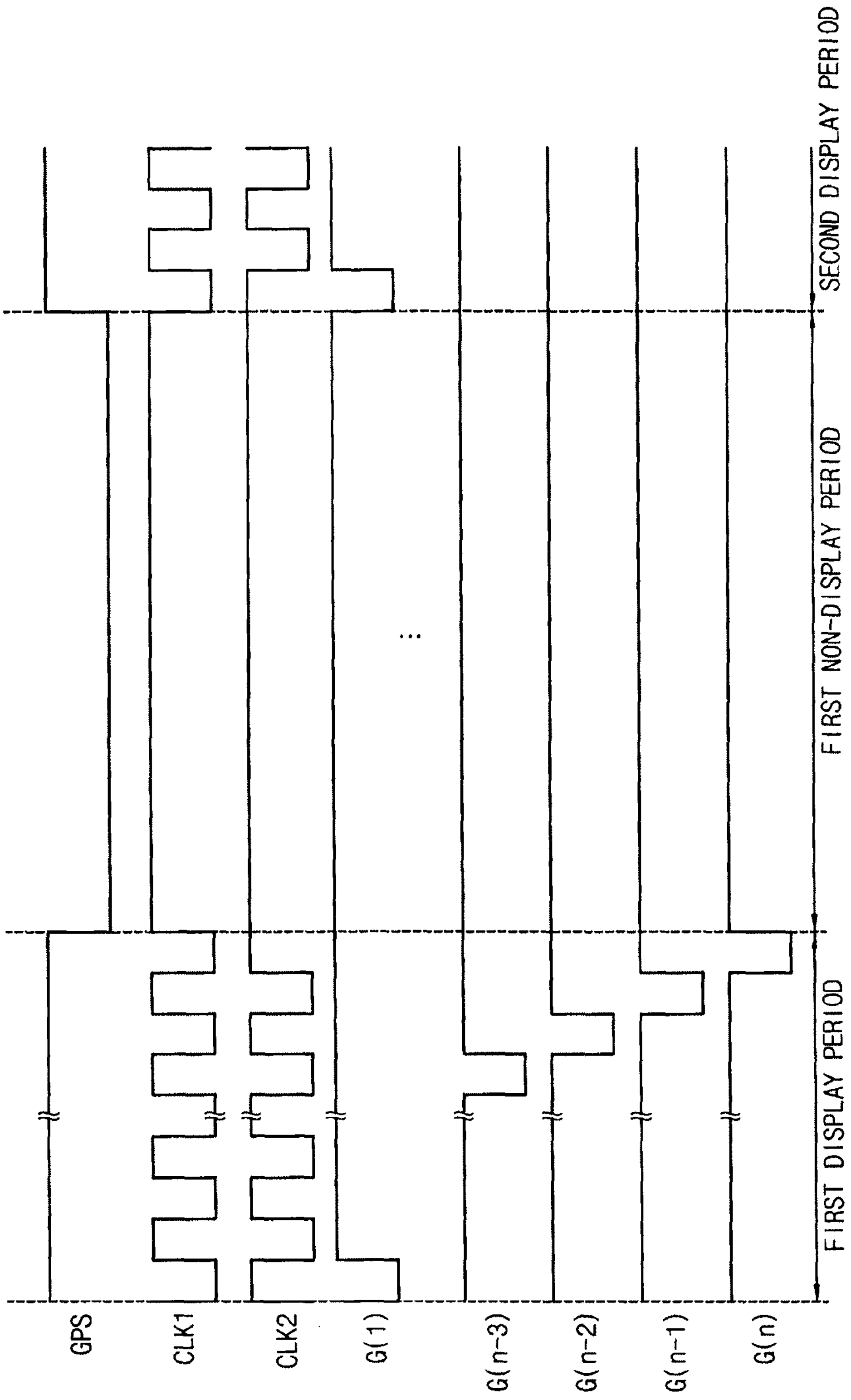
FIG. 5 illustrates another example of signals of the gate driver circuit.

FIG. 5 is a timing diagram illustrating another example of control signals for the gate driver circuit 140 in FIG. 2. Referring to FIG. 5, an output control signal GPS having a first logic level (e.g., low level) is output and the first and second gate clock signals CLK1, CLK2 having a second logic level (e.g., high level) are output during a predetermined non-display period when image data are still image data. Thus, the display device 100 may perform low frequency driving while the still image data are output, by controlling the output control signal GPS, the first gate clock signal CLK1, and second gate clock signal CLK2.

For example, the output control signal GPS may be maintained at the second logic level (e.g., high level) and the first and second gate clock signals CLK1, CLK2 may be clock signals having different timings during the first display period FIRST DISPLAY PERIOD. Therefore, the first through (N)-th gate output signals G(1), G(2), . . . , G(N) are sequentially output and images corresponding to the image data are displayed in the display region.

Thereafter, the output control signal GPS having the first logic level is output, and the first and second gate clock signals CLK1, CLK2 having the second logic level are output to drive the display panel 120 at low frequency during the predetermined first non-display period FIRST NON-DISPLAY PERIOD. The display device 100 may perform low frequency driving by the display periods and the non-display periods, that are alternately arranged.

Lengths of the non-display periods may be adjusted to prevent flicker. For example, flicker may occur according to the size and/or type of the display panel 120 or grayscale values of the image data. In one example embodiment, lengths of the non-display periods are adjusted according to the display panel 120. The length of the non-display period may be substantially equal to the length of the display period. For example, the display device 100 may output 60 frame data per second. In this case, the display device 100 may output 30 frame data per second when the image data are still image data. In another example embodiment, the length of the non-display period may be dynamically adjusted according to the grayscale value(s) of the image data.

Figure 6:
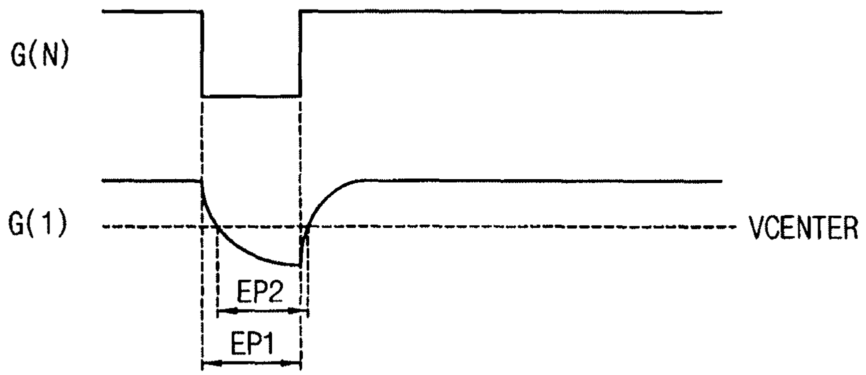
FIG. 6 illustrates an example of the operation of the first gate driver.
Figure 7:
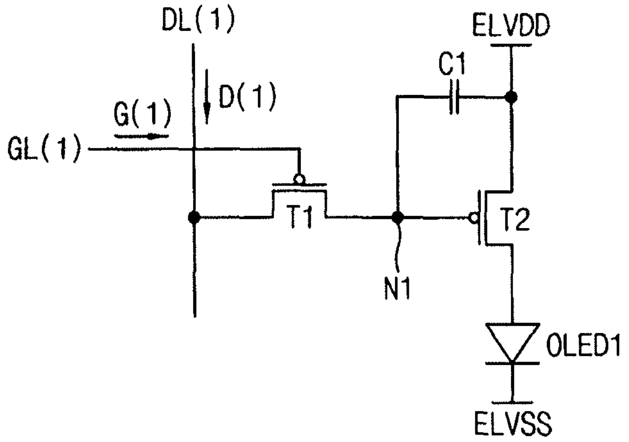
FIG. 7 illustrates an embodiment of a pixel.

FIG. 6 is a timing diagram illustrating an example of the operation of the first gate driver GDU1 in FIG. 2, and FIG. 7 illustrates an embodiment of a pixel P11 (e.g., a first pixel) in the display device of FIG. 1.

Referring to FIG. 7, the pixel P11 includes transistors T1, T2, a capacitor C1, and an organic light emitting diode OLED1. The first transistor T1 includes a source electrode connected to the first data line DL(1) to which the first data signal D(1) is applied, a gate electrode connected to the first gate line GL1 to which the first gate signal G(1) is applied, and a drain electrode connected to a first node N1. The capacitor C1 includes a first electrode connected to the first node N1 and a second electrode to which the supply voltage ELVDD is applied. The second transistor T2 includes a source electrode to which the supply voltage ELVDD is applied, a gate electrode connected to the first node N1, and a drain electrode connected to a first electrode of the organic light emitting diode OLED1. The ground voltage ELVSS is applied to a second electrode of the organic light emitting diode OLED1.

Remaining pixels P12, P13, P1M, P21 through P23, P2M, PN1 through PN3, and PNM in the display device 100 of FIG. 1 may have the same or similar structure as pixel P11.

Referring to FIGS. 6 and 7, luminance of the N row pixels PN1, PN2, PN3 through PNM does not decrease because the (N)-th gate line GL(N) is close to the first surface 125 and IR drop of the supply voltage ELVDD is small. If the current of the (N)-th gate signal G(N) is set to a sufficient value, the (N)-th gate driver GDUN may drive the (N)-th row pixels PN1, PN2, PN3 through PNM as the (N)-th gate signal G(N) without RC delay. In this case, the pulse width of the activation period EP1 of the (N)-th gate signal G(N) is maintained. The capacitor C1 is charged or discharged during the maintained activation period EP1. The voltage of the first node N1 may rise to a voltage level of the first data signal D(1). The second transistor T2 may drive the first organic light emitting diode OLED1 as a first current corresponding to the voltage level of the first data signal D(1).

Luminance of the first row pixels P11, P12, P13 through P1M decreases because the first gate line GL(1) is far from the first surface 125 and IR drop of the supply voltage ELVDD is relatively large. If the current of the first gate signal G(1) is set to be less than the current of the (N)-th gate signal G(N), the first gate driver GDU1 may drive the first row pixels P11, P12, P13 through P1M as the first gate signal G1 having RC delay. In this case, the pulse width of the activation period EP2 of the first gate signal G(1) is reduced. The capacitor C1 is charged or discharged during the reduced activation period EP2. The voltage of the first node N1 may raise to a first voltage level lower than a voltage level of the first data signal D(1). The second transistor T2 may drive the first organic light emitting diode OLED1 as a second current higher than the first current based on the first voltage level, and may compensate luminance reduction of the first row pixels P11, P12, P13 through P1M.

Figure 8:
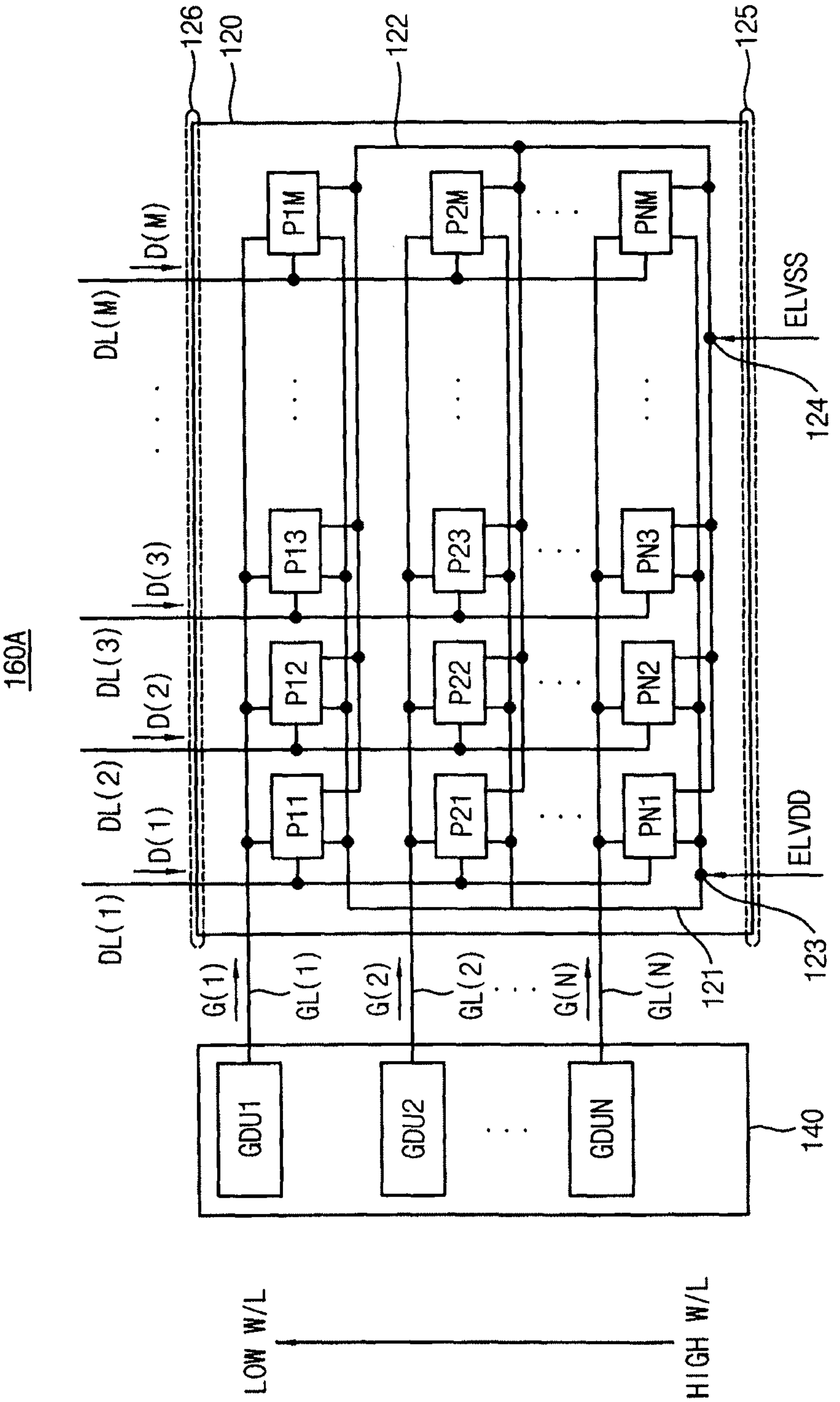
FIG. 8 illustrates an embodiment of a first circuit in the display device.

FIG. 8 illustrates an embodiment of the first circuit 160A, which, for example, may be included in the display device of FIG. 1. Referring to FIG. 8, when current of the gate drivers GDU1, GDU2 through GDUN are controlled based on IR drop of the supply voltage ELVDD, a first ratio of width and length of an output transistor in the first gate driver GDU1 may be set to be lower than a second ratio of width and length of an output transistor in the second gate driver GDU2. The second ratio may be set to be lower than an (N)-th ratio of width and length of an output transistor in the (N)-th gate driver GDUN.

In an example embodiment, if the (N)-th ratio is A, a first ratio is B (B is less than A) and the luminance of the first row pixels P11, P12, P13 through P1M is set to be the same as the luminance of the (N)-th row pixels PN1, PN2, PN3 through PNM. Also, the second ratio may be B+(A−B)/(N−1) and a third ratio of width and length of an output transistor in the third gate driver may be B+2*(A−B)/(N−1). Also, an (N−1)-th ratio of width and length of an output transistor in the (N−1)-th gate driver may be A−(A−B/(N−1).

In an example embodiment, the first gate driver GDU1 may control the current of the first gate signal G(1) based on a first IR-drop of the supply voltage ELVDD to the first row pixels P11, P12, P13 through P1M through the supply voltage distribution line 121, and based on a second IR-drop of the data signals D(1), D(2), D(3) through D(M) to the first row pixels P11, P12, P13 through P1M through the data lines DL(1), DL(2), DL(3) through DL(M).

The second gate driver GDU2 may control the current of the second gate signal G(2) based on a third IR-drop of the supply voltage ELVDD to the second row pixels P21, P22, P23 through P2M through the supply voltage distribution line 121, and based on a fourth IR-drop of the data signals D(1), D(2), D(3) through D(M) to the second row pixels P21, P22, P23 through P2M through the data lines DL(1), DL(2), DL(3) through DL(M).

The (N)-th gate driver GDUN may control the current of the (N)-th gate signal G(N) based on a fifth IR-drop of the supply voltage ELVDD to the (N)-th row pixels PN1, PN2, PN3 through PNM through the supply voltage distribution line 121, and based on a sixth IR-drop of the data signals D(1), D(2), D(3) through D(M) to the (N)-th row pixels PN1, PN2, PN3 through PNM through the data lines DL(1), DL(2), DL(3) through DL(M). Controlling the current of the gate drivers GDU1, GDU2 through GDUN based on the IR drop of the supply voltage ELVDD may be understood with reference to FIGS. 6 and 7.

In one embodiment, luminance of the N row pixels PN1, PN2, PN3 through PNM is greater than luminance of the first row pixels P11, P12, P13 through P1M because the (N)-th gate line GL(N) is farther away from the second surface 126 than the first gate line GL1 and because IR drop of the data signals D(1), D(2), D(3) through D(M) is larger. If the current of the first gate signal G(1) is set to be less than the current of the (N)-th gate signal G(N), the pulse width of the activation period of the first gate signal G(1) is reduced to be less than the pulse width of the activation period of the (N)-th gate signal G(N).

In the gate driver GDU1, the capacitor C1 is charged or discharged during the reduced activation period. The voltage of the first node N1 may increase to a first voltage level lower than a voltage level of the first data signal D(1). The second transistor T2 may drive the first organic light emitting diode OLED1 based on the first voltage level, and may compensate a luminance difference between the first row pixels P11, P12, P13 through P1M and the (N)-th row pixels PN1, PN2, PN3 through PNM.

Figure 9:
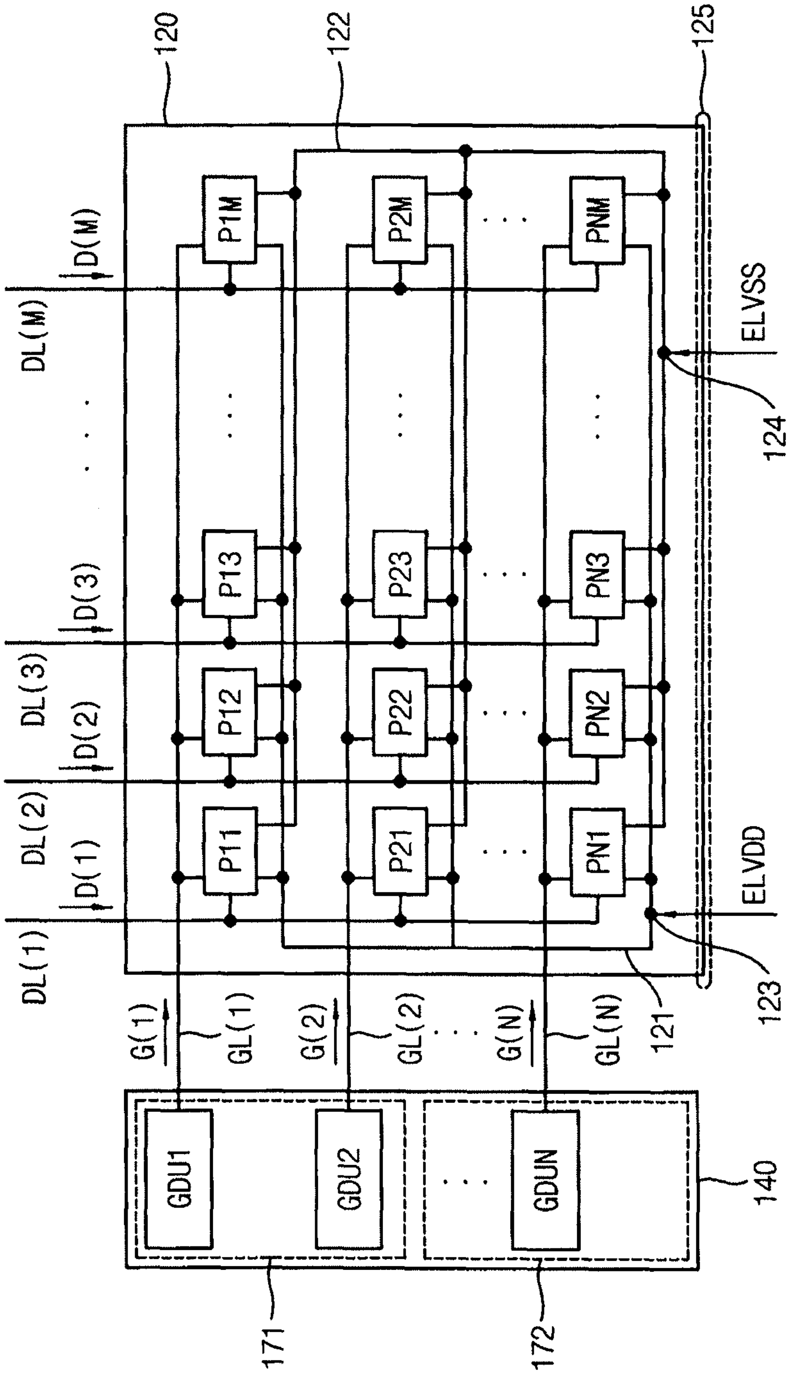
FIG. 9 illustrates another embodiment of the first circuit.

FIG. 9 illustrates another example embodiment of the first circuit 160B, which, for example, may be included in the display device of FIG. 1. Referring to FIG. 9, the gate drivers GDU1, GUD2 through GDUN may include first gate drivers 171 and second gate drivers 172. The first gate drivers 171 may generate first gate signals G(1), G(2) having a first current and the second gate drivers 172 may generate second gate signals G(N) having a second current greater than the first current when first gate lines GL(1), GL(2) connected to the first gate drivers 171 are farther away from the first surface 125 than second gate lines GL(N) connected to the second gate drivers 172.

Figure 10:
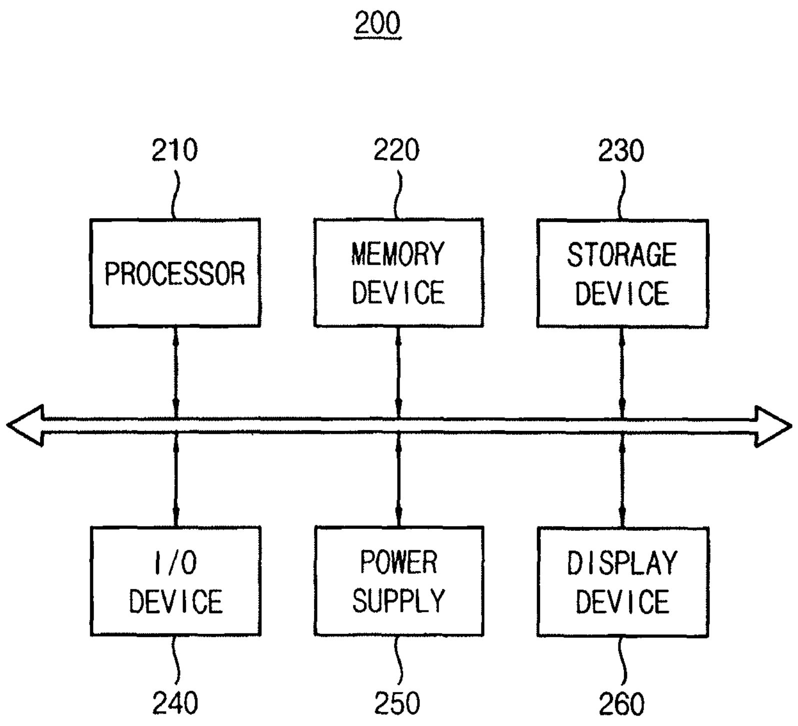
FIG. 10 illustrates an embodiment of an electronic device.

FIG. 10 illustrates an embodiment of an electronic device 200 which includes a processor 210, a memory device 220, a storage device 230, an input/output (I/O) device 240, a power supply 250, and a display device 260. The electronic device 200 may further include a plurality of ports for communicating with a video card, a sound card, a memory card, a universal serial bus (USB) device, and/or other electronic devices. Although FIG. 10 illustrates that the electronic device 200 is a smart-phone, electronic device 200 may be a notebook computer, media player, tablet, television, or another type of electronic device which includes or is coupled to a display.

The processor 210 may perform various computing functions. The processor 210 may be implemented in logic which, for example, may include hardware, software, or both. When implemented at least partially in hardware, the processor 210 may be, for example, any one of a variety of integrated circuits including but not limited to an application-specific integrated circuit, a field-programmable gate array, a combination of logic gates, a system-on-chip, a microprocessor, central processing unit, or another type of processing or control circuit.

When implemented in at least partially in software, the processor 210 may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods described herein.

The processor 210 may be coupled to other components via an address bus, a control bus, a data bus, etc. Further, the processor 210 may be coupled to an extended bus such as a peripheral component interconnection (PCI) bus.

The memory device 220 may store data for operations of the electronic device 200. For example, the memory device 220 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc, and/or at least one volatile memory device such as a dynamic random access memory (DRAM) device, a static random access memory (SRAM) device, a mobile DRAM device, etc.

The storage device 230 may be a solid state drive (SSD) device, a hard disk drive (HDD) device, a CD-ROM device, etc. The I/O device 240 may be an input device such as a keyboard, a keypad, a touchpad, a touch-screen, a mouse, etc, and an output device such as a printer, a speaker, etc. The power supply 250 may provide a power for operations of the electronic device 200. The display device 260 may communicate with other components via the buses or other communication links.

The display device 260 may be any of the aforementioned embodiments of the display device. Also, the example embodiments may be applied to any electronic system 200 having the display device 260. For example, the present embodiments may be applied to the electronic system 200, such as a digital or 3D television, a computer monitor, a home appliance, a laptop, a digital camera, a cellular phone, a smart phone, a personal digital assistant (PDA), a portable multimedia player (PMP), a MP3 player, a portable game console, a navigation system, a video phone, etc.

By way of summation and review, a pixel may include a driving transistor that provides current to an OLED, which causes the OLED to emit light with a grayscale level based on image data. In order to emit light, a supply voltage and data signals are provided via distribution lines in the display. A voltage drop (IR-drop) occurs on the distribution lines to cause degradation in image quality. Also, a lower supply voltage and data signals having lower voltages may affect the amount of current flowing through the driving transistors of the pixels, and also may degrade long range uniformity of the display device.

In accordance with one or more of the aforementioned embodiments, a first gate driver controls the current of a first gate signal based on an IR-drop of a supply voltage coupled to a first row pixels through a supply voltage distribution line. Another gate driver controls the current of a second gate signal based on an IR-drop of the supply voltage coupled to another row of pixels through the supply voltage distribution line. The current of the first gate signal may be less than the current of the second gate signal based on different positions of a first gate line coupled to the first row pixels and a second gate line coupled to the second row pixels.

In accordance with these or other embodiments, lengths of a non-display period may be adjusted to prevent flicker. For example, flicker may occur according to the size and/or type of a display panel or grayscale values of image data. The lengths of the non-display period may be adjusted according to the display panel and/or according to grayscale value(s) of the image data.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A display device, comprising:

a display panel including a plurality of pixels, a supply voltage distribution line, and a ground voltage distribution line, the supply voltage distribution line and the ground voltage distribution line connected to the pixels;

a voltage supplier to provide a supply voltage to a first node and a ground voltage to a second node, the first node being included in the supply voltage distribution line and close to a first surface of the display panel, the second node being included in the ground voltage distribution line and close to the first surface;

a timing controller to generate a data driver control signal and a gate driver control signal based on an input image signal;

a data driver to generate a plurality of data signals based on the data driver control signal, and to provide the data signals to the pixels through a plurality of respective data lines; and a gate driver circuit including a plurality of gate drivers to generate gate signals based on the gate driver control signal, and to provide the gate signals to the pixels through a plurality of respective gate lines, wherein:

at least one first gate driver is to transfer a first gate signal to first row pixels included in the pixels through a first gate line, and the first gate driver is to control a current of the first gate signal based on a first IR-drop of the supply voltage to the first row pixels through the supply voltage distribution line.

2. The display device as claimed in claim 1, wherein the first gate driver includes an output transistor to generate the first gate signal based on the gate driver control signal.

3. The display device as claimed in claim 2, wherein the current of the first gate signal is controlled based on a ratio of a width and a length of the output transistor.

4. The display device as claimed in claim 1, wherein the first gate driver is to decrease the current of the first gate signal when the first IR-drop increases.

5. The display device as claimed in claim 4, wherein a pulse width of an activation period of the first gate signal is to decrease and a luminance of the first row pixels is to increase when the current of the first row pixels decreases.

6. The display device as claimed in claim 1, wherein the first gate driver is to increase the current of the first gate signal when the first IR-drop decreases.

7. The display device as claimed in claim 6, wherein a pulse with of an activation period of the first gate signal is to increase and a luminance of the first row pixels is to decrease when the current of the first row pixels increases.

8. The display device as claimed in claim 1, wherein the first IR-drop is proportional to a distance between the first node and the first row pixels on the supply voltage distribution line.

9. The display device as claimed in claim 1, wherein:

at least one second gate driver is to transfer a second gate signal to a second row pixels included in the pixels through a second gate line, the second gate driver is to control a current of the second gate signal based on a second IR-drop of the supply voltage to the second row pixels through the supply voltage distribution line.

10. The display device as claimed in claim 9, wherein the current of the first gate signal is less than the current of the second gate signal when the first gate line is farther from the first surface than the second gate line.

11. The display device as claimed in claim 9, wherein:

the plurality of the gate drivers includes a plurality of first gate drivers and a plurality of second gate drivers, and the first gate drivers generate first gate signals having a first current and the second gate drivers generate second gate signals having a second current when first gate lines connected to the first gate drivers are farther from the first surface than second gate lines connected to the second gate drivers, the second current greater than the first current.

12. A display device, comprising:

a display panel including a plurality of pixels, a supply voltage distribution line, and a ground voltage distribution line, the supply voltage distribution line and the ground voltage distribution line connected to the pixels;

a voltage supplier to provide a supply voltage to a first node and a ground voltage to a second node, the first node being included in the supply voltage distribution line and close to a first surface of the display panel, the second node being included in the ground voltage distribution line and close to the first surface;

a data driver to generate a plurality of data signals based on a data driver control signal, and to provide the data signals to the pixels through a plurality of respective data lines; and a gate driver circuit including a plurality of gate drivers to generate gate signals based on a gate driver control signal, and to provide the gate signals to the pixels through a plurality of respective gate lines, wherein:

at least one first gate driver is to transfer a first gate signal to a first row pixels included in the pixels through the first gate line, the first gate driver is to control a current of the first gate signal based on a first IR-drop of the supply voltage to the first row pixels through the supply voltage distribution line and a second IR-drop of the data signals to the first row pixels through the data lines.

13. The display device as claimed in claim 12, wherein the first IR-drop is proportional to a distance between the first node and the first row pixels on the supply voltage distribution line.

14. The display device as claimed in claim 12, wherein:

the first gate driver is to decrease the current of the first gate signal when the first IR-drop increases, and the first gate driver is to increase the current of the first gate signal when the second IR-drop increases.

15. The display device as claimed in claim 12, wherein:

the first gate driver is to increase the current of the first gate signal when the first IR-drop decreases, and the first gate driver is to decrease the current of the first gate signal when the second IR-drop decreases.

16. A gate driver circuit, comprising:

an interface; and a gate driver coupled to the interface, wherein the gate driver is to generate a gate signal for input to a row of pixels, the gate driver to transfer the gate signal to the row of pixels and to control a current of the gate signal based on an IR-drop of a supply voltage supplied to the first row of pixels through a supply voltage distribution line.

17. The gate driver circuit as claimed in claim 16, wherein the gate driver includes an output transistor to generate the gate signal, and wherein the current of the gate signal is based on a ratio of a width and a length of the output transistor.

18. The gate driver circuit as claimed in claim 16, wherein the gate driver is to decrease the current of the first gate signal when the IR-drop increases.

19. The gate driver circuit as claimed in claim 18, wherein a pulse width of an activation period of the gate signal is to decrease and a luminance of the row of pixels is to increase when the current of the first row of pixels decreases.

20. The gate driver circuit as claimed in claim 16, wherein the gate driver is to increase the current of the gate signal when the IR-drop decreases.

* * * * *